United States Patent [19]

Kreuzer et al.

[11] Patent Number: 5,306,109
[45] Date of Patent: Apr. 26, 1994

[54] TRANSPORTABLE MEDICAL APPARATUS, IN PARTICULAR INFUSION SUPPLY

[75] Inventors: Friedhelm Kreuzer, Munich; Armin Stöckl, Ohlstadt, both of Fed. Rep. of Germany

[73] Assignee: Kreuzer GmbH & Co. OHG, Puchheim, Fed. Rep. of Germany

[21] Appl. No.: 938,158

[22] PCT Filed: Apr. 22, 1992

[86] PCT No.: PCT/EP92/00889

§ 371 Date: Nov. 30, 1992

§ 102(e) Date: Nov. 30, 1992

[87] PCT Pub. No.: WO92/18085

PCT Pub. Date: Oct. 29, 1992

[30] Foreign Application Priority Data

Apr. 23, 1991 [DE] Fed. Rep. of Germany ....... 4113228

[51] Int. Cl.⁵ ............................................. B65G 69/00
[52] U.S. Cl. .................................. 414/343; 414/349; 414/396; 414/402; 414/584; 5/81.1
[58] Field of Search ............... 414/343, 349, 391–392, 414/399, 401–402, 396, 584, 608, 921; 5/81.1, 620, 658, 510

[56] References Cited

U.S. PATENT DOCUMENTS

| | | | |
|---|---|---|---|
| 3,183,777 | 5/1965 | Damm | 414/401 X |
| 3,362,704 | 1/1968 | Pilz | 414/349 X |
| 3,512,387 | 5/1970 | Ames | |
| 3,631,546 | 1/1972 | Eliasson | 414/391 X |
| 4,277,218 | 7/1981 | Schweichler | 414/401 |
| 4,538,950 | 9/1985 | Shiomi et al. | 414/392 X |
| 4,724,844 | 2/1988 | Rafelson | |
| 4,795,122 | 1/1989 | Petre | |
| 4,861,220 | 8/1989 | Smith | 414/401 x |
| 4,953,245 | 9/1990 | Jung | 5/81.1 |
| 5,117,521 | 6/1992 | Foster et al. | 5/510 |
| 5,123,797 | 6/1992 | Schnelle et al. | 414/401 |
| 5,135,191 | 8/1992 | Schmuhl | 5/658 X |
| 5,149,036 | 9/1992 | Sheehan | 5/658 X |

FOREIGN PATENT DOCUMENTS

| | | | |
|---|---|---|---|
| 0992522 | 7/1976 | Canada | 5/620 |
| 9003157 | 4/1990 | European Pat. Off. | |
| 0400407 | 12/1990 | European Pat. Off. | |
| 2812074 | 5/1979 | Fed. Rep. of Germany | |
| 3145310 | 5/1983 | Fed. Rep. of Germany | |

Primary Examiner—Michael S. Huppert
Assistant Examiner—James Keenan
Attorney, Agent, or Firm—Donald Brown

[57] ABSTRACT

An infusion supply apparatus is provided which can be connected with a stationary apparatus such as an overhead support (1) on the one hand, and with a patient transporter (3) on the other hand. In order to allow an easy and locking transfer from one such apparatus to the other the stationary apparatus (1), the patient transporter (3) and a mobile chassis (5) each have a coupling member (2, 4, 9) and a support for the medical appliances has a coupler system (13) cooperating with respective two such coupling members. The coupling system (13) comprises a locking apparatus (19, 20) which unlocks for selective release of an engagement if two coupling members engage the coupling system and which locks upon engagement of a single coupling member.

13 Claims, 4 Drawing Sheets

TRANSPORTABLE MEDICAL APPARATUS, IN PARTICULAR INFUSION SUPPLY

The invention relates to a transportable medical apparatus, in particular an infusion supply apparatus, comprising a support and appliances to be mounted to the support, for the care of patients.

Such an apparatus is known from DE-A-39 17 892.

The DE-A-31 45 310 further discloses an appliance receiving system in the medical technology, wherein the appliance is fixed to an appliance frame having guide rails and of two catches which cooperate with a locking bar the appliance frame can be connected with a lifted truck for transport and with a frame receiver at the place of application.

This system is relatively space-consuming and provided for heavy and voluminous appliances.

Further, the DE-B-28 12 074 discloses a patient bedding plate which can be transferred from a carriage to a table mounting and which has couplings with pivotable catches for connection with the carriage or the table mounting, respectively. This catch lock enables the patient bedding plate to swing around a horizontal axis by 360° and secures the reliable support thereof independent of eventual operating errors.

This apparatus is—corresponding to its function—large and expensive; the latter also applies to the couplings and locks.

It is the object of the invention to modify the generic apparatus so as to allow a particularly simple coupling and transfer from the stationary apparatus to the patient transporting means and vice versa.

This object is achieved by the transportable medical apparatus defined in claim 1.

Further embodiments of the invention are defined in the subclaims.

In the following, embodiments are described with reference to the Figures. In the Figures.

Figure 1:
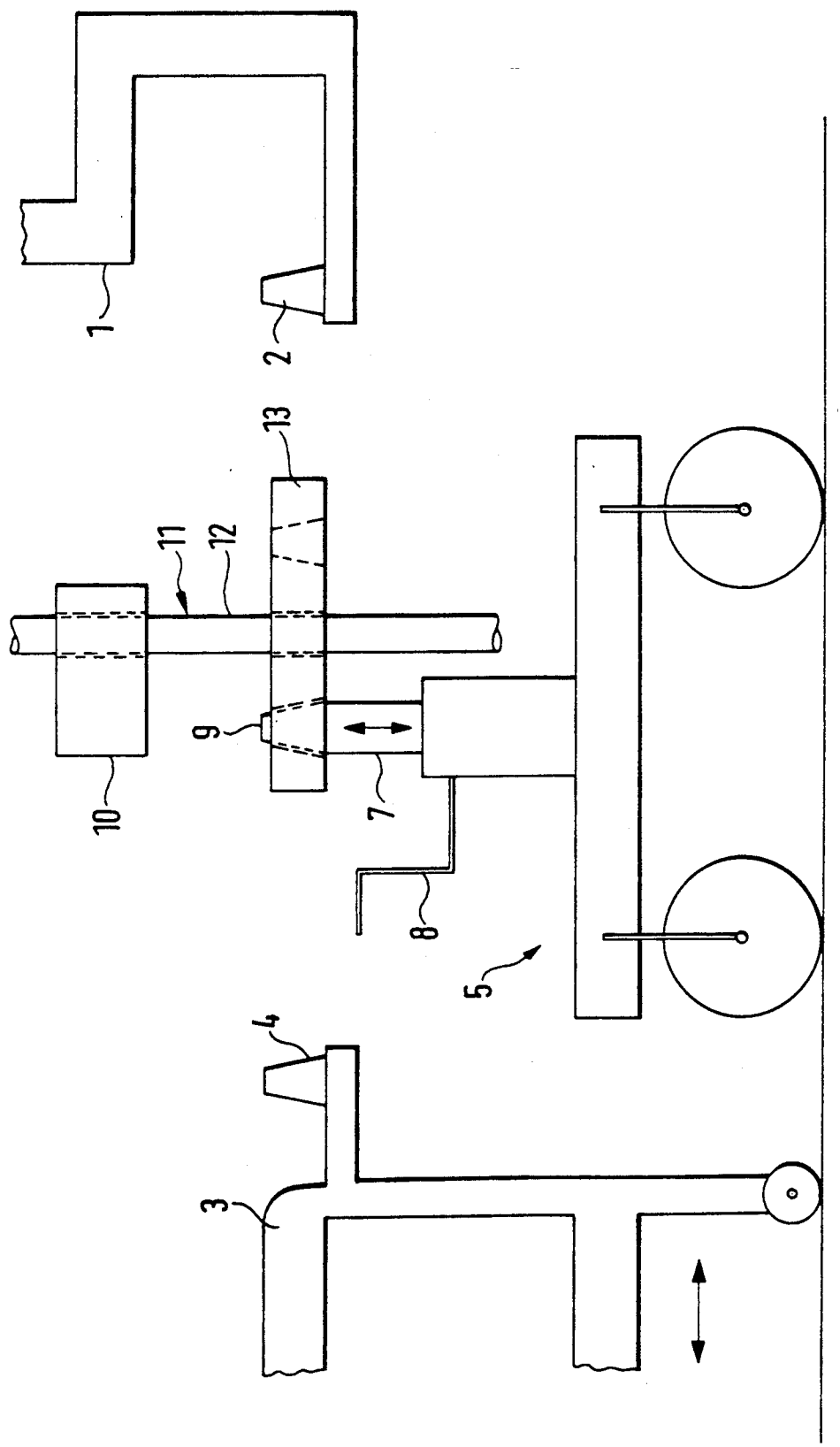
FIG. 1 shows a schematic representation of a transportable medical apparatus with support and patient transporting means.

FIG. 1 shows a part of an overhead support 1 with a trunnion 2 mounted thereto and extending vertically upwards. A further trunnion 4 which also extends vertically upwards is provided at a frame portion of a bed 3 serving as a patient transporting means. A mobile chassis 5 comprises a lifting apparatus 6 on a chassis. The lifting apparatus has an upwardly extendable and retractable, respectively, piston 7 which can be moved through pneumatic means or through a corresponding drive for operation by a crank 8. At the upper free end thereof the piston 7 has a third trunnion 9 which also extends vertically upwards. The three trunnions 2, 4 and 9 are in parallel alignment to each other.

A support base 11 carrying the medical appliances 10 of the infusion supply apparatus comprises a support rod 12 for mounting the appliances 10 thereto and a plate-shaped member forming a coupling means 13. The coupling means 13 comprises a substantially plate-shaped body 14. A vertical bore 15 for receiving the support rod 12 extends through the center of the plate. A locking member 16 which is formed as an asymmetrically supported pintle is provided for locking the coupling means 13 at the support rod 12. By rotating this locking member, the lock between both parts can be released and the coupling means can be vertically adjusted at the support rod 12.

Figure 4:
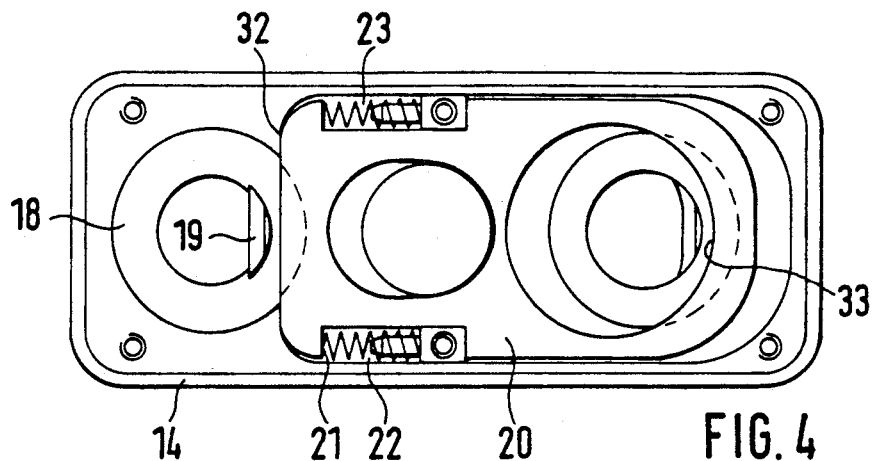
FIG. 4 is a bottom view of the apparatus of FIG. 2 with removed cover.
Figure 2:
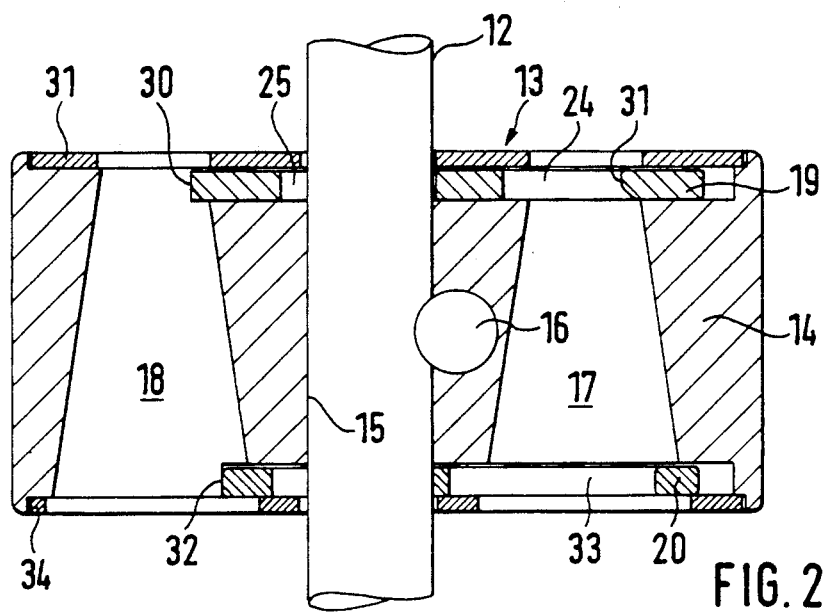
FIG. 2 is a section through the coupling means cooperating with the coupling members in an uncoupled state.
Figure 3:
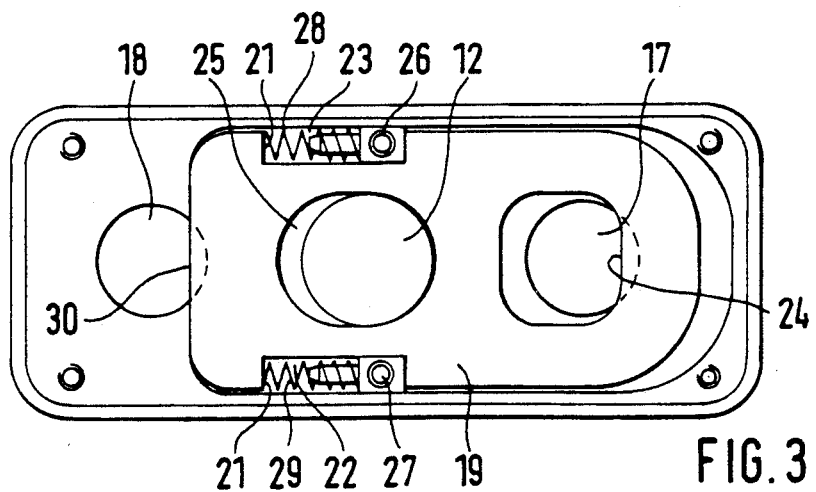
FIG. 3 is a top view of the apparatus of FIG. 2 with removed cover.

The coupling means comprises two holes 17, 18 which extend parallel to the axis of the bore 15 receiving the support rod 12 at positions symmetric with respect to this bore. As may be best seen from FIG. 2, the two holes each have upwardly tapering conical walls. As best shown in FIG. 2 to 4, a first slider 19 is provided close to the upper edge of the holes and a second slider 20 is provided close to the lower edge of the holes. The two sliders can be shifted in a direction perpendicular to the axis of the holes 17 and 18 thus perpendicular to the axis of the support rod 12. The first slider 19 comprises a first aperture 24 having a dimension which is selected such that it corresponds to the size of the hole 17 if the first slider is in a corresponding retracted position. Further, a second aperture 25 is provided, as best shown in FIG. 3, in the form of an elongate hole. The diameter is selected such that the support rod 12 is guided in the elongate hole. Stops 26, 27 are provided within the apertures 22, 23 and rigidly connected to the body 14. Prestressed compression springs 28, 29 are disposed between the stops and stop faces 21 of the apertures 22, 23 facing the stops. The sizes of the first slider and of the first aperture 24 are dimensioned such that the free front edge 30 or an edge 31 of the aperture 24 extends into the holes 17 and 18, respectively, if the slider is in the position shown in the FIG. 2 and 3 which is caused by the spring bias. On the other hand, the slider can be shifted against the spring force to such an extent that it completely clears the holes 17, 18. The first slider 19 is retained and covered by the cover screwed to the body 14.

The second slider is formed in correspondence to the first slider and has a corresponding spring bias. It differs only with respect to the dimensions inasfar as its free front edge 32 and its first aperture 33 are dimensioned such that they extend into the holes 17, 18 when being in the free position caused by the spring bias, as shown in FIG. 2, and clear both holes in the position thereof which is retracted against the spring bias. The second slider is also slidably covered by a cover 34 which is screwed to the body.

The trunnion 9 connected to the piston 7 has an annular recess 35 formed as an undercut and positioned at a small distance from the upper edge thereof. The position of the annular recess is selected such that it is placed exactly in the plane of the first slider 19 when inserted into the hole 18 of the coupling means 13. The dimensions of the recess are selected such that the first slider 19 just fits into the recess. The other trunnions, i.e. the trunnion 2 at the overhead support 1 and the trunnion 4 at the bed 3 are formed such that they have a corresponding annular recess 36 at a small distance from the lower edge thereof. This recess is positioned in axial direction so as to lie in a common plane with the second slider 20. The dimensions regarding depths and height of the annular recess are again selected such that the second slider just fits into the recess 36.

In the embodiment shown, the cone angle of the trunnion and of the associated recesses is selected to be around 22°. By this means, the coupling means 13 may swing around the respective trunnion but a certain breaking force against unintentional swing is achieved by action of the gravity force in combination with the inclination angle. Cylindrical trunnions with corresponding cylindrical holes may be selected in place of the conical trunnions.

In the following, the operation of the described embodiment will be explained with reference to the removal of the coupling means 13 carrying the support rod 12 from the trunnion 2 to the trunnion 9 of the mobile chassis as an example.

Figure 5:
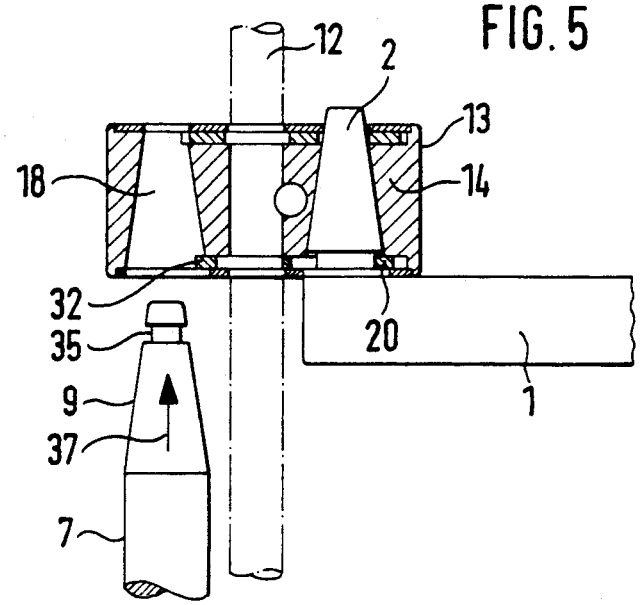
FIG. 5 shows the apparatus of FIG. 2 wherein the trunnion of a patient transporting means or of the stationary apparatus is locked.

In the beginning, the support rod 12 together with the coupling means 13 is supported on the trunnion 2 of the overhead support in the manner shown in FIG. 5. The trunnion takes care for the guide. A lock is obtained owing to the engagement of the second slider which has been brought into the position shown in FIG. 2 by the spring bias and the annular recess 36.

For transferring the support rod with the associated coupling means the trunnion 9 is lifted upwards in direction of the arrow 37 by means of the piston cylinder means such that the trunnion 9 enters the hole 18. When entering, the outer peripheral surface of the trunnion 9 pushes the front edge 32 extending into the hole 18 out of the hole against the action of the spring force. It is thereby achieved that also the first aperture 33 is displaced such that it coincides with the hole 17, whereby simultaneously the trunnion 2 is released.

In the next step, the piston 7 is further lifted upwards to such an extent that the coupling means 13 with the support rod 12 and the appliances 10 mounted thereto are lifted from the trunnion 2. As soon as the trunnion 2 is pulled out of the hole 17 to such an extent that the peripheral surface of the trunnion 2 no longer acts against the edge of the spring-biased first slider 19, the spring bias pushes the front edge 30 of the first slider into the annular recess 35 and thereby locks the coupling means 13 to the trunnion 9. The transfer of the coupling means 13 with the support rod 12 to the trunnion 4 of the bed or of the patient transporting means, respectively, is carried out in an inverse manner by aligning with the trunnion 4, lowering down onto the trunnion 4 and finally lowering the trunnion 9 and final locking of the coupling means 13 to the trunnion 4.

In the above-described embodiment, the trunnion of the mobile chassis has an annular recess at the upper edge thereof whereas the other trunnions have an annular recess at the lower edge thereof, which arrangement may, however, also be inversed. It is only relevant that there is a respective difference between the trunnion of the mobile chassis and the remaining trunnions.

Figure 8A:
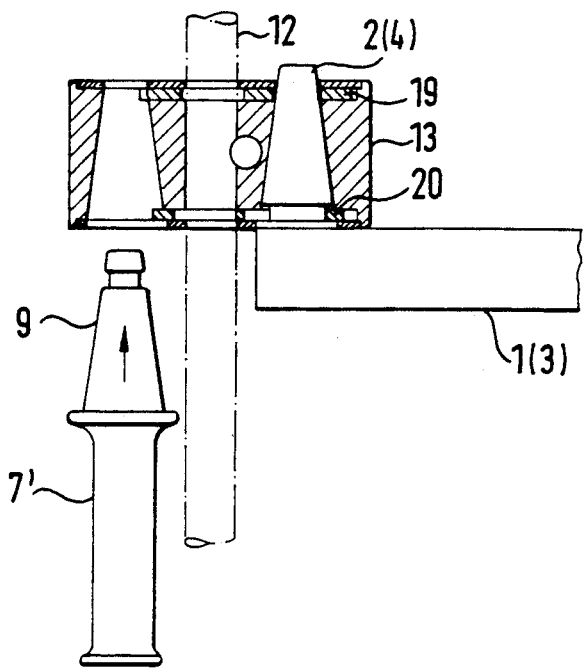
FIGS. 8a–c shows a modified embodiment in the representation corresponding to that of FIG. 1.
Figure 8B:
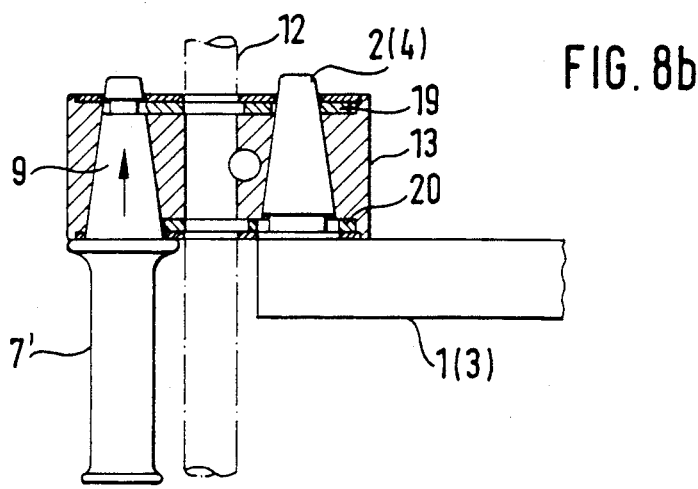
Figure 8C:
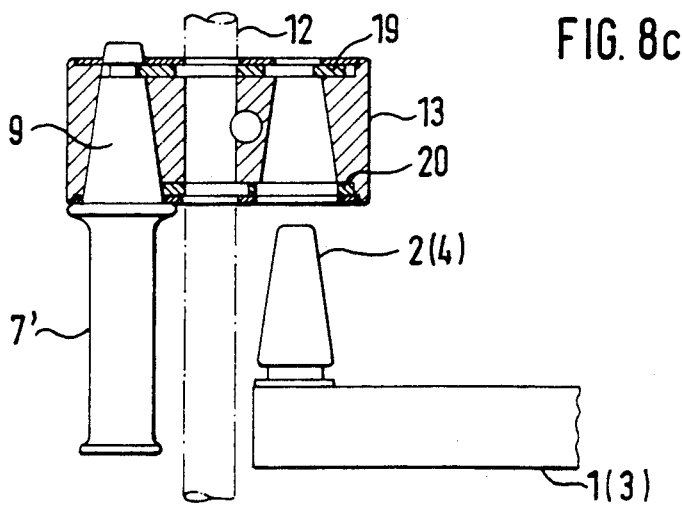

In the embodiment shown in FIG. 8, the mobile chassis acting as a transfer means is replaced by a handle-shaped means 7'. The lower part thereof is formed as a rod-shaped handle. The form of the upper free end is identical to the upper free end of the piston 7 of the mobile chassis. All other features are identical with those of the embodiment shown in FIG. 1.

Figure 6:
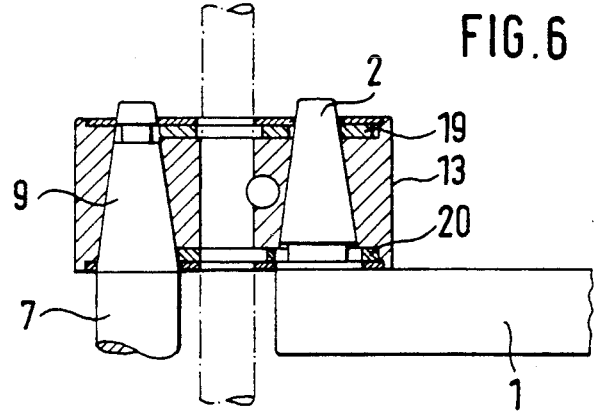
FIG. 6 is a representation of FIG. 5 wherein both trunnions are inserted into the coupling means.
Figure 7:
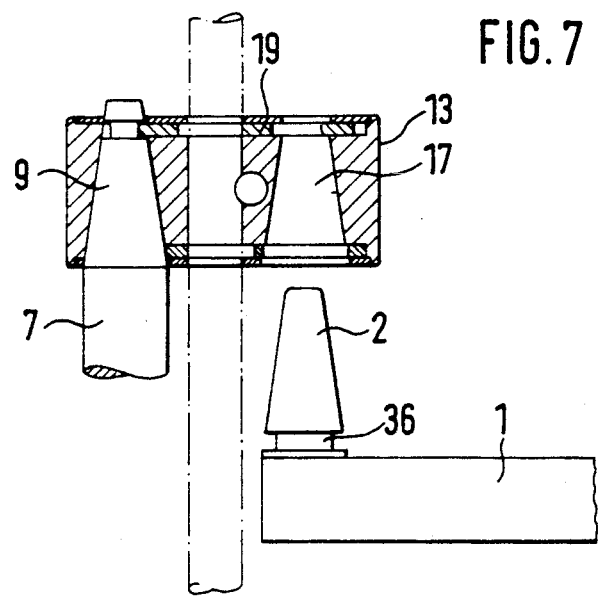
FIG. 7 is a representation of FIG. 5 wherein only the trunnion of the mobile chassis is inserted and locked.

The representations a), b), and c) of FIG. 8 correspond to the operational states shown in FIGS. 5 to 7.

We claim:

1. Transportable medical apparatus, in particular infusion supply apparatus, with
    a support (12);
    appliances (10) mountable to said support (12) for the care of patients,
    wherein said support (12) comprises a coupling means (13) and said coupling means (13) comprises locking means (19, 20);
    means (5) for transferring said support (12) having a first coupling member (9) cooperating with said coupling means (13);
    a second coupling member (2) mounted at a stationary apparatus, in particular a stationary support (1) and cooperating with said coupling means (13); and
    a third coupling member (4) mounted to a patient transporting means (3) and cooperating with said coupling means (13),
    wherein said coupling means (13) is formed such that one as well as two of said first, second, and third coupling members (2, 4, 9) can be engaged to said coupling means (13) at any time; and
    wherein said locking means, (19, 20) is formed such that in case one of said first, second, and third coupling members (2, 4, 9) is engaged to said coupling means, (13) said one of said first, second, and third coupling members (2, 4, 9) is locked to said coupling means, (13);
    and that in case two of said first, second, and third coupling members (2, 4, 9) are engaged to said coupling means, (13) said two of said first, second, and third coupling members (2, 4, 9) and said coupling means (13) are unlocked so that the respective engagements of said two of said first, second, and third coupling members and said coupling means are releasable.

2. Transportable medical apparatus according to claim 1, characterized in that the first, second and third coupling members are formed as first, second and third trunnions, respectively, having a shape to which holes of the coupling means are adapted.

3. Transportable medical apparatus according to claim 2, characterized in that the first, second and third trunnions are oriented in a vertical direction.

4. Transportable medical apparatus according to claim 3, characterized in that the first, second and third trunnions project upwards.

5. Transportable medical apparatus according to claim 4, characterized in that the first, second and third trunnions have a conical peripheral surface portion.

6. Transportable medical apparatus according to claim 2, 3, 4, 5, or 1,
    characterized in that a respective recess for engaging the locking means is provided at a first position of each of the second and third trunnions connected to the stationary apparatus and to the patient transporting means, respectively, and at a second position of the first trunnion connected to the means for transferring said support.

7. Transportable medical apparatus according to claim 6 characterized in that the locking means comprises a first slider and a second slider, which are both spring biased such that the sliders project into the respective recesses at one of the first position of the second and third trunnions and the second position of the first trunnion, respectively, and that the slider can be pushed to clear the recess against the spring bias.

8. Transportable medical apparatus according to claim 7, characterized in that the recesses are formed as undercuts and that the first position of the second and third trunnions is axially offset from the second and third position of the first trunnion.

9. Transportable medical apparatus according to claim 7, characterized in that the means for transferring the support is formed as a mobile chassis for moving the support.

10. Transportable medical apparatus according to claim 6, characterized in that the recesses are formed as undercuts and that the first position of the second and third trunnions is axially offset from the second position of the first trunnion.

11. Transportable medical apparatus according to claim 10, characterized in that the means for transferring the support is formed as a mobile chassis for moving the support.

12. Transportable medical apparatus according to claim 6,
characterized in that the means for transferring the support is formed as a mobile chassis for moving the support.

13. Transportable medical according to claim 2, 3, 4, 5, or 1, characterized in that the means for transferring the support is formed as a mobile chassis for moving the support.

* * * * *